United States Patent

Müller

[19]

[11] Patent Number: 6,000,605
[45] Date of Patent: Dec. 14, 1999

[54] GUARD DEVICE FOR A POSTAGE METER

[75] Inventor: Dietrich Müller, Berlin, Germany

[73] Assignee: Francotyp Postalia Aktiengesellschaft, Birkenwerder, Germany

[21] Appl. No.: 09/023,959

[22] Filed: Feb. 17, 1998

[30] Foreign Application Priority Data

Feb. 19, 1997 [DE] Germany ............................ 19706376

[51] Int. Cl.$^6$ .................................................. G06K 7/15
[52] U.S. Cl. ......................... 235/375; 235/384; 235/475; 235/482; 235/483; 705/401
[58] Field of Search ............................ 235/375, 384, 235/475, 479, 482, 483, 484, 485, 486; 347/4, 1; 101/383; 705/408, 401; 271/157, 9.09

[56] References Cited

U.S. PATENT DOCUMENTS

| | | | |
|---|---|---|---|
| 3,757,942 | 9/1973 | Gunn | 235/375 |
| 3,983,366 | 9/1976 | Gunn | 235/375 |
| 4,083,555 | 4/1978 | Irvine et al. | 271/10 |
| 4,119,194 | 10/1978 | Freeman et al. | 198/400 |
| 4,155,440 | 5/1979 | Bogdanski et al. | 198/399 |
| 4,868,757 | 9/1989 | Gil | 364/464.03 |
| 5,065,000 | 11/1991 | Pusic | 235/381 |
| 5,106,321 | 4/1992 | Haroutel | 439/310 |
| 5,467,709 | 11/1995 | Salomon | 101/93 |
| 5,842,800 | 12/1998 | Bailey et al. | 400/703 |
| 5,880,747 | 3/1999 | Bartenwerfer et al. | 347/4 |
| 5,915,685 | 6/1999 | Bausch et al. | 271/157 |

FOREIGN PATENT DOCUMENTS

| | | |
|---|---|---|
| 33 12 657 C2 | 9/1991 | Germany . |
| 195 08 180 A1 | 9/1996 | Germany . |

*Primary Examiner*—Donald Hajec
*Assistant Examiner*—Douglas X. Rodriguez
*Attorney, Agent, or Firm*—Herbert L. Lerner

[57] ABSTRACT

A guard device for a postage meter, in particular protects an operator upon reaching into a mail feed mechanism for feeding letters that are inclined slightly to the rear and stand on one edge in a guide gap. The mail feed mechanism includes a revolving conveyor belt and contact-pressure elements secured thereto. Covering hoods are provided in a lateral deflection region of the conveyor belt. The risk to the operator is prevented even upon using the postage meter incorrectly by providing a side wall part of the covering hood in an exit region from the guide gap. The side wall part is easily released with the force of a finger and is coupled with a safety switch that short-circuits a motor which drives the conveyor belt if the side wall part is removed. A finger that becomes caught is thus released and the conveyor belt is stopped in an accelerated manner because of the effect of counter-inductance.

4 Claims, 3 Drawing Sheets

GUARD DEVICE FOR A POSTAGE METER

BACKGROUND OF THE INVENTION

Field of the Invention

The invention relates to a guard device for a postage meter, especially for protecting an operator upon reaching into a mail or envelope feed mechanism.

Until now, printing in postage meters has primarily been carried out by inking rollers or thermal print heads. The individual letter is fed horizontally, resting on a conveyor belt, until it reaches the printing unit. A maximum slot width between the printing unit and the conveyor belt is 8 mm, so that the fingers of an operator cannot get caught, as is seen in German Patents DE 38 16 548 C2 and DE 41 14 963 C2 and German Published, Non-Prosecuted Patent Application DE 42 28 765 A1.

Recently, attempts have been made to exploit the advantages of ink jet printing in postage meter technology as well. The printing is carried out in a contactless manner with ink jet printing heads, as is seen in German Patent DE 44 24 771 C1 and German Utility Model DE 94 20 734 U1.

In that connection, a postage meter has been proposed in German Patent Applications DE 19 605 014 and DE 19 605 015, in which the letters are fed standing upright, tilted slightly backward, with the aid of a revolving conveyor belt. The letters rest on a guide plate in which a printing window is provided and in which the ink jet printing head is installed in a stationary manner. Contact-pressure elements secured to the conveyor belt press the letters against the guide plate and carry them along by friction. Except for a guide gap for the letters, the transport region is covered in such a way that the risk of an operator reaching in from above is prevented.

However, reaching in is still possible in the lateral exit region for the letters since the guide gap can have a width of up to 20 mm, although reaching in is not permitted according to the instructions for use. When the conveyor belt is in operation, a finger inserted from the side into the guide gap can become caught between a contact-pressure element and the lateral covering of the conveyor belt and can be squeezed, depending on the driving force. The driving force is dimensioned in such a way that even letters or packages with a mass of 2000 g are still securely fed. The clamping force in the transport direction is then correspondingly great. Slippage of the drive is precluded, since a toothed belt drive is employed. There is accordingly a need for safety provisions.

On the other hand, a device for printing markings on flat pieces of mail with one or more printing stations each having at least one print head are known, as is seen from German Published, Non-Prosecuted Patent Application DE 195 08 180 A2. The mail is moved upright past the printing stations, resting on a curtain or lever and clamped in place between a conveyor belt and a cover belt. Nothing is the about safety provisions.

Finally, a safety switch for removable guard hoods, doors or flaps is also known from German Patent DE 33 12 657 C2. The safety switch includes a switch housing and an actuator, which is insertable into the switch housing to reach a first switching position, that is a switch on position, and can be pulled all the way out of the switch housing to reach a second switch position, that is a switch off position. A switch member that is axially displaceable inside the switch housing is movable by the actuator.

SUMMARY OF THE INVENTION

It is accordingly an object of the invention to provide a guard device for a postage meter, which overcomes the hereinafore-mentioned disadvantages of the heretofore-known devices of this general type, which improves operator protection and with which risk to the operator is prevented even if the postage meter is used incorrectly.

With the foregoing and other objects in view there is provided, in accordance with the invention, in a postage meter including a mail feed mechanism having a revolving conveyor belt, contact-pressure elements secured to the conveyor belt, a guide plate having a printing window formed therein, an ink jet print head fixedly installed in the printing window, and a guide gap for feeding letters standing on one edge and resting on the guide plate, the guide gap having an exit region as seen in a transport direction, a guard device for protecting an operator upon reaching into the mail feed mechanism, the guard device comprising a covering hood disposed laterally around the conveyor belt; a motor for driving the conveyor belt; and a safety switch disposed in the covering hood for switching the motor; the covering hood having a side wall part in the exit region from the guide gap and having a remaining part, the side wall part force-lockingly and form-lockingly connected to the remaining part of the covering hood and force-lockingly connected to the safety switch, and the side wall part to be released by a force of a finger exerted in the transport direction.

In accordance with another feature of the invention, the safety switch is a pressure switch having a key, the side wall part has a snap connection securing the side wall part to the covering hood, the side wall part has a formed-on tab pressing against the key, and the side wall part has a curved guide incline for compulsory finger guidance.

In accordance with a further feature of the invention, there is provided an electronically controlled power supply having positive and negative poles; the motor having first and second terminals; and the safety switch acting as a reversing switch having a key to be actuated by the side wall part, a reversing switch contact electrically connected to the first motor terminal and mechanically force-lockingly connected to the key, a first terminal contact connected to the second motor terminal and to the positive pole of the power supply, and a second terminal contact connected to the negative pole of the power supply.

In accordance with a concomitant feature of the invention, the reversing switch contact is connected to the second terminal contact when the key is depressed, and the reversing switch contact is connected to first terminal contact and to second motor terminal when the key is released for short-circuiting the motor.

The inventive structure of the lateral covering for the conveyor belt and of the safety switch, coupled with it, for the drive motor of the conveyor belt has various, sometimes even synergistic, advantageous effects.

Since the side wall part is only connected to the covering hood through the use of a snap connection, it is a mere matter of routine to dimension the snapping forces in such a way that this part does not release during normal operation, or at the least is burst off with the force transmitted to a finger by the contact-pressure element. Accordingly, an operator can already free himself or herself even if his or her reaction speed is greater than the transport speed of the conveyor belt. As soon as the side wall part comes loose, the safety switch is actuated or its key is released. As a consequence, the reversing switch snaps to the other position, in which not only is the motor disconnected at one pole from its power supply but the winding of the motor for driving the conveyor belt is also short-circuited. At that moment, the motor is switched as a generator, having a counter induction voltage that substantially shortens the deceleration process.

The curved portion in the side wall part forces the caught finger to reach a region in which the most favorable force step-up ratio for releasing the side wall part is located.

Other features which are considered as characteristic for the invention are set forth in the appended claims.

Although the invention is illustrated and described herein as embodied in a guard device for a postage meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1a is an enlarged, fragmentary, perspective view of a portion Ia of FIG. 1;

DESCRIPTION OF THE PREFERRED EMBODIMENTS

Figure 1:
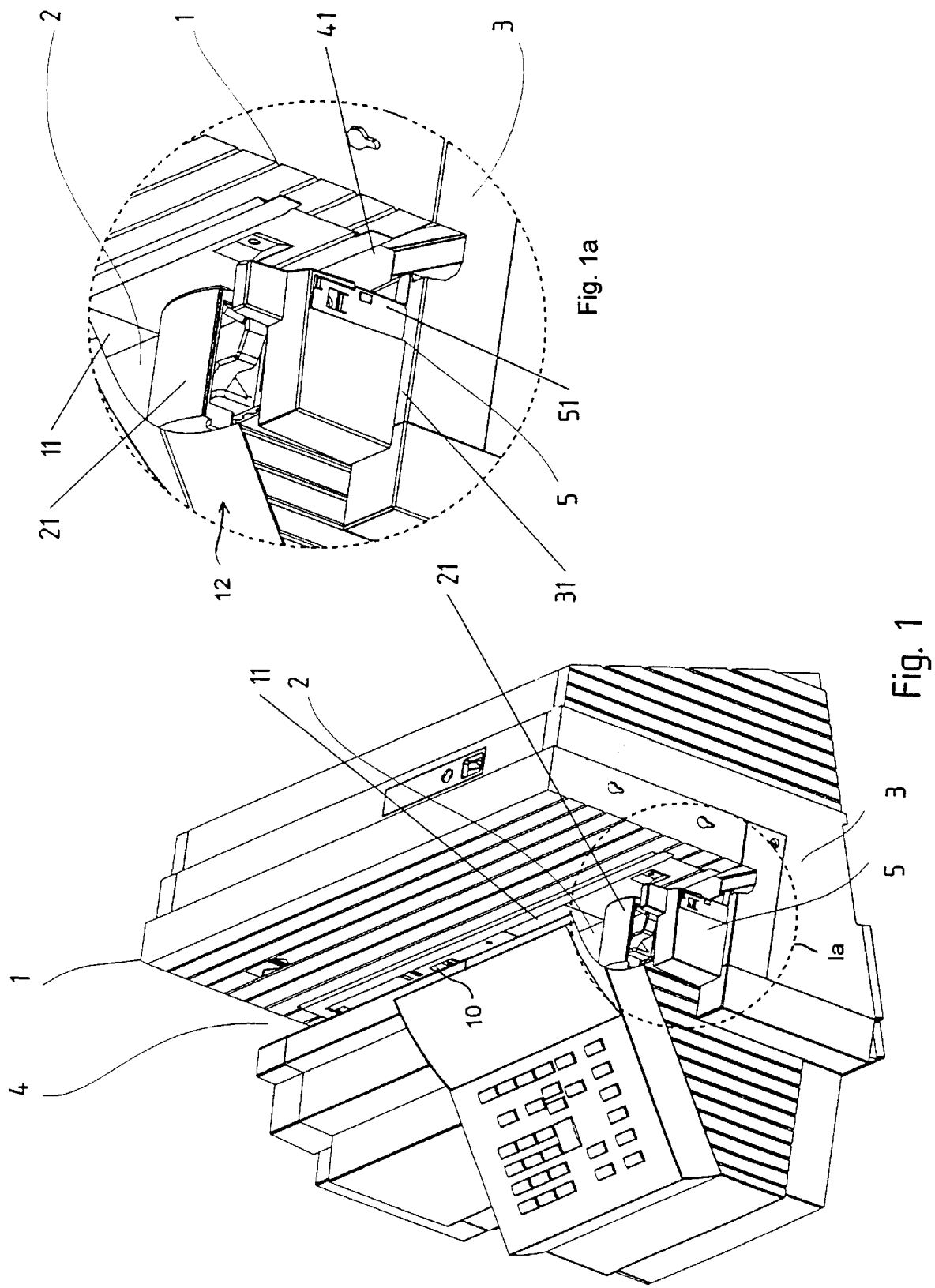
FIG. 1 is a diagrammatic, perspective view of a postage meter with the guard device of the invention.

Referring now in detail to the figures of the drawings, which are partly diagrammatic for the sake of simplification and for easier comprehension, and first, particularly, to FIGS. 1 and 1a thereof, there is seen a postage meter which has the following elements:

- a guide plate 1 having a printing window 11 formed therein and an ink jet print head 10 fixedly installed in the printing window;
- a mail feed mechanism 12 having a revolving conveyor belt 2 with contact-pressure elements 21 secured thereto;
- a side wall 3 in a letter or envelope exit region; and
- a lateral covering hood 5 for the conveyor belt 2 in its turnaround region.

The letters or mail are fed in the postage meter inside a guide gap 4 sliding along the guide plate 1. The letters are pressed against the guide plate 1 and entrained through the use of the contact-pressure elements 21. A front boundary of the guide gap 4 is formed jointly by a front housing part of the postage meter and a non-illustrated PLEXIGLASS plate. The plexiglass plate protrudes upward approximately as far as the guide plate 1, so that an operator cannot reach into the mail feed mechanism from above.

The covering hood 5 is set onto a front part 31 of the side wall 3 and there together with the guide plate 1 forms an exit portion 41 of the guide gap 4. From this side, it is possible to reach into an area between two contact-pressure elements 21.

The covering hood 5 has a side wall part 51, which is force-lockingly and form-lockingly connected to the remainder of the covering hood in such a way that the side wall part is forced out by the transporting force of the contact-pressure element 21 if a finger is inserted. A force-locking connection is one which connects two elements together by force external to the elements, as opposed to a form-locking connection which is provided by the shapes of the elements themselves.

Figure 2:
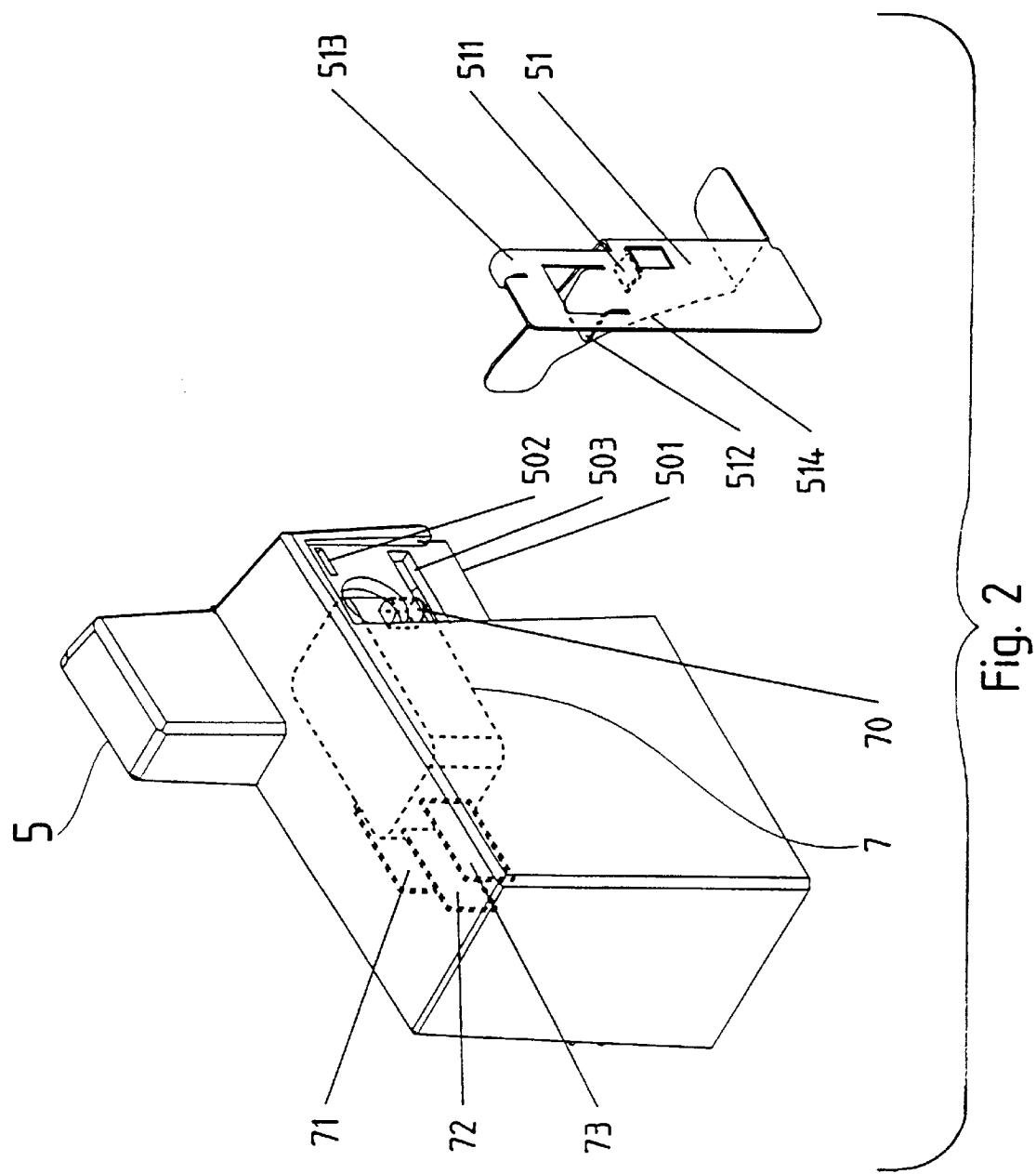
FIG. 2 is an exploded, perspective view of a lateral covering hood for a conveyor belt in an exit region.

FIG. 2 illustrates how the side wall part 51 is releasably secured to the covering hood 5 through the use of a snap connection. To that end, the side wall part 51 is provided with a snap hook 511 and a stop boss 513 on an upper end. Correspondingly, an edge 501 and a slot 502 are provided in the covering hood 5. The stop boss 513 protrudes into the slot 502, and the snap hook 511 grasps the edge 501 and in the process pulls the stop boss toward the lower edge of the slot 502. A releasable snap connection is formed in this way.

A curved recess or guide incline 514 causes a finger of an operator to be put into a position in which the most favorable force step-up ratio for releasing the side wall part 51 is present.

A tab 512 which is formed on between the stop boss 513 and the snap hook 511 protrudes through an associated opening 503 in the covering hood 5. A safety switch 7, which is constructed as a reversing switch, is secured in the covering hood 5 in such a way that its key 70 is located behind the opening 503. When the side wall part 51 is snapped into place its tab 512 presses against the key 70, so that a current circuit of a motor 6 shown FIG. 3 for driving the conveyor belt 2, is closed. Therefore, the side wall part 51 is force-lockingly and form-lockingly connected to the remaining part of the covering hood 5 and is force-lockingly connected to the safety switch 7, so that the side wall part 51 is released by a force of a finger exerted in the transport direction along which letters move toward the exit region 41.

Figure 3:
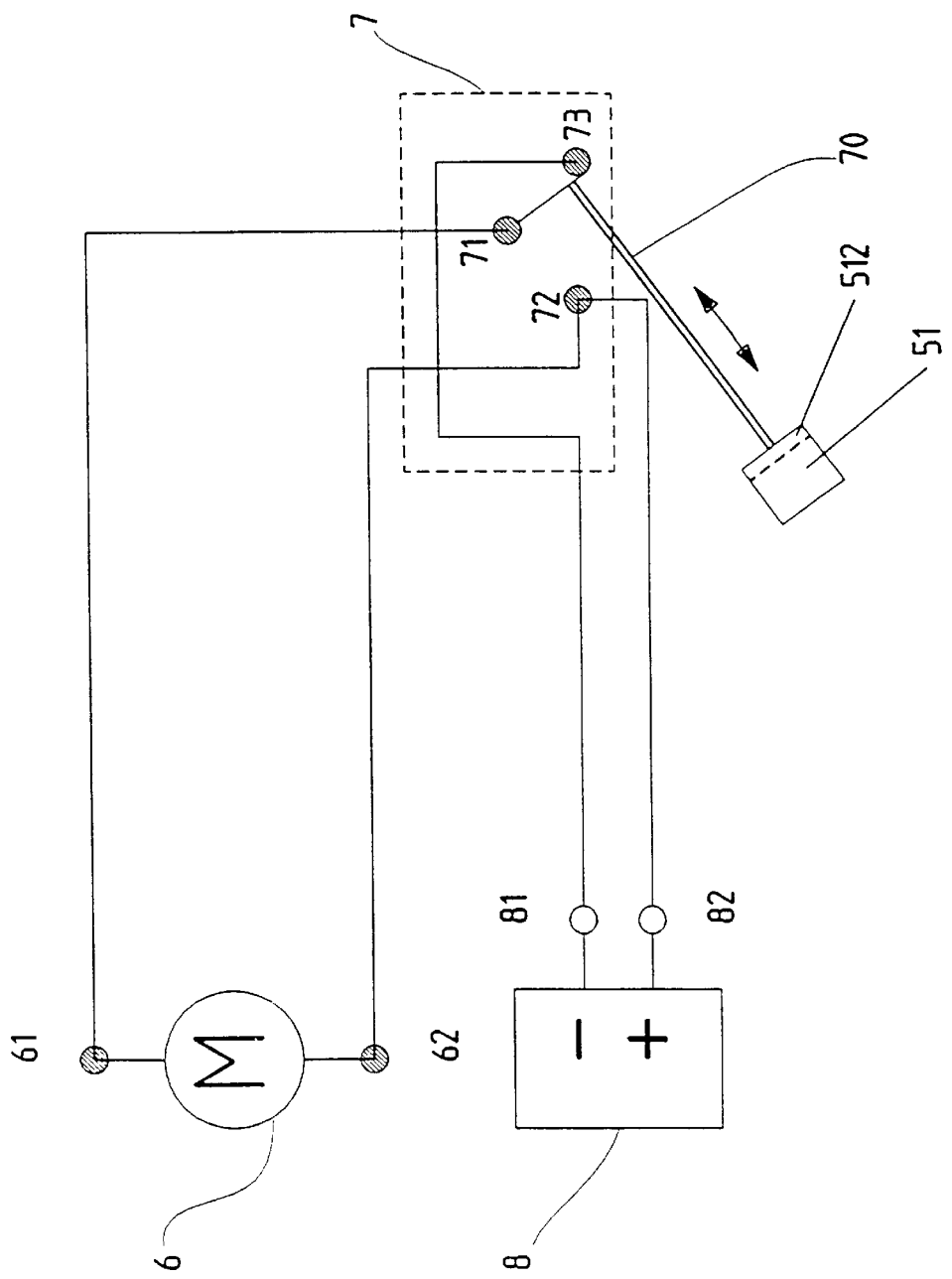
FIG. 3 is a diagrammatic and a schematic illustration of an electromechanical guard device according to the invention.

FIG. 3 shows that the key 70, of the safety switch 7 which is constructed as a reversing switch, is coupled mechanically to the side wall part 51 by the tab 512.

The key 70 is in turn mechanically coupled with a reversing switch contact 71 of the safety switch 7. The safety switch 7 also has a first terminal contact 72 and a second terminal contact 73.

The motor 6 for driving the conveyor belt 2 has first and second terminals 61, 62 and is supplied with current pulses by an electronically regulated power supply 8. The first motor terminal 61 is connected to the reversing switch contact 71. The second motor terminal 62 is connected to the first reversing switch contact 72 and to a positive pole 82 of the power supply 8. The second terminal contact 73 is connected to a negative pole 81 of the power supply 8.

When the side wall part 51 is snapped into place, the key 70 is pressed by the tab 512. As a consequence, the reversing switch contact 71 is connected to the second terminal contact 73, and thus the negative pole 81 is switched through to the first motor terminal 61. The motor current circuit is therefore closed.

When the side wall part 51 is unsnapped, the tab 512 is released from the key 70, so that the key springs back, and the reversing switch contact 71 is connected to the first terminal contact 72. The current branch to the negative pole 81 is thus interrupted, the two motor terminals 61, 62 are both connected to the positive pole 82 and the motor winding is short-circuited. It is only a counter induction, because of the residual motion of the conveyor belt or of the motor, which is then operative and reinforces a deceleration process.

I claim:

1. In a postage meter including a mail feed mechanism having a revolving conveyor belt, contact-pressure elements secured to the conveyor belt, a guide plate having a printing window formed therein, an ink jet print head fixedly installed in the printing window, and a guide gap for letters standing on one edge and resting on the guide plate, the guide gap having an exit region as seen in a transport direction, a guard device for protecting an operator upon reaching into the mail feed mechanism, the guard device comprising:

a covering hood disposed laterally around the conveyor belt;

a motor for driving the conveyor belt; and a safety switch disposed in said covering hood for switching said motor;

said covering hood having a side wall part in the exit region from the guide gap and having a remaining part, said side wall part force-lockingly and form-lockingly connected to said remaining part of said covering hood and force-lockingly connected to said safety switch, and said side wall part to be released by a force of a finger exerted in the transport direction.

2. The device according to claim 1, wherein said safety switch is a pressure switch having a key, said side wall part has a snap connection securing said side wall part to said covering hood, said side wall part has a formed-on tab pressing against said key, and said side wall part has a curved guide incline for compulsory finger guidance.

3. The device according to claim 1, including:

an electronically controlled power supply having positive and negative poles;

said motor having first and second terminals; and said safety switch acting as a reversing switch having a key to be actuated by said side wall part, a reversing switch contact electrically connected to said first motor terminal and mechanically force-lockingly connected to said key, a first terminal contact connected to said second motor terminal and to said positive pole of said power supply, and a second terminal contact connected to said negative pole of said power supply.

4. The device according to claim 3, wherein said reversing switch contact is connected to said second terminal contact when said key is depressed, and said reversing switch contact is connected to first terminal contact and to second motor terminal when said key is released for short-circuiting said motor.

* * * * *